(12) United States Patent
Shiraishi et al.

(10) Patent No.: US 12,166,836 B2
(45) Date of Patent: Dec. 10, 2024

(54) COMMUNICATION SYSTEM, INSPECTION APPARATUS, INSPECTION METHOD, AND PROGRAM

(71) Applicant: NIPPON TELEGRAPH AND TELEPHONE CORPORATION, Tokyo (JP)

(72) Inventors: Masahiro Shiraishi, Tokyo (JP); Hiroki Nagayama, Tokyo (JP); Tomoaki Washio, Tokyo (JP); Asami Miyajima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/552,065

(22) PCT Filed: Apr. 1, 2021

(86) PCT No.: PCT/JP2021/014231
§ 371 (c)(1),
(2) Date: Sep. 22, 2023

(87) PCT Pub. No.: WO2022/208857
PCT Pub. Date: Oct. 6, 2022

(65) Prior Publication Data
US 2024/0223672 A1    Jul. 4, 2024

(51) Int. Cl.
*H04L 9/08* (2006.01)
*H04L 27/28* (2006.01)
*H04L 41/06* (2022.01)
*H04L 67/55* (2022.01)

(52) U.S. Cl.
CPC ............ *H04L 67/55* (2022.05); *H04L 41/06* (2013.01)

(58) Field of Classification Search
CPC . H04L 67/55; H04L 41/06; H04L 9/08; H04L 27/28
USPC .......................................................... 709/224
See application file for complete search history.

(56) References Cited

U.S. PATENT DOCUMENTS

| | | | | |
|---|---|---|---|---|
| 7,130,867 B2 * | 10/2006 | Luke | ........................ | G06F 16/10 |
| 2005/0086469 A1 * | 4/2005 | Dunagan | ............ | H04L 12/1877 713/163 |
| 2014/0129838 A1 * | 5/2014 | Kim | .................... | H04L 63/0807 713/171 |

OTHER PUBLICATIONS

DDS Foundation "What's in the DDS Standard?", Retrieved on Aug. 7, 2023 from Internet <URL: https://www.dds-foundation.org/omg-dds-standard/>.

* cited by examiner

Primary Examiner — Jude Jean Gilles
(74) Attorney, Agent, or Firm — IPUSA, PLLC

(57) ABSTRACT

A communication system that performs communication among a plurality of nodes by a broker-less type publishing/subscribing model, includes: a computer including a memory and a processor configured to detect distribution of unauthorized data from one application that is handled with priority on a subscriber side among one or more applications that are redundant on one or more of the nodes and functioning as a publisher side; and switch an application handled with priority on the subscriber side to another application different from the one application among the one or more applications in a case where distribution of the unauthorized data is detected.

8 Claims, 11 Drawing Sheets

Fig. 4
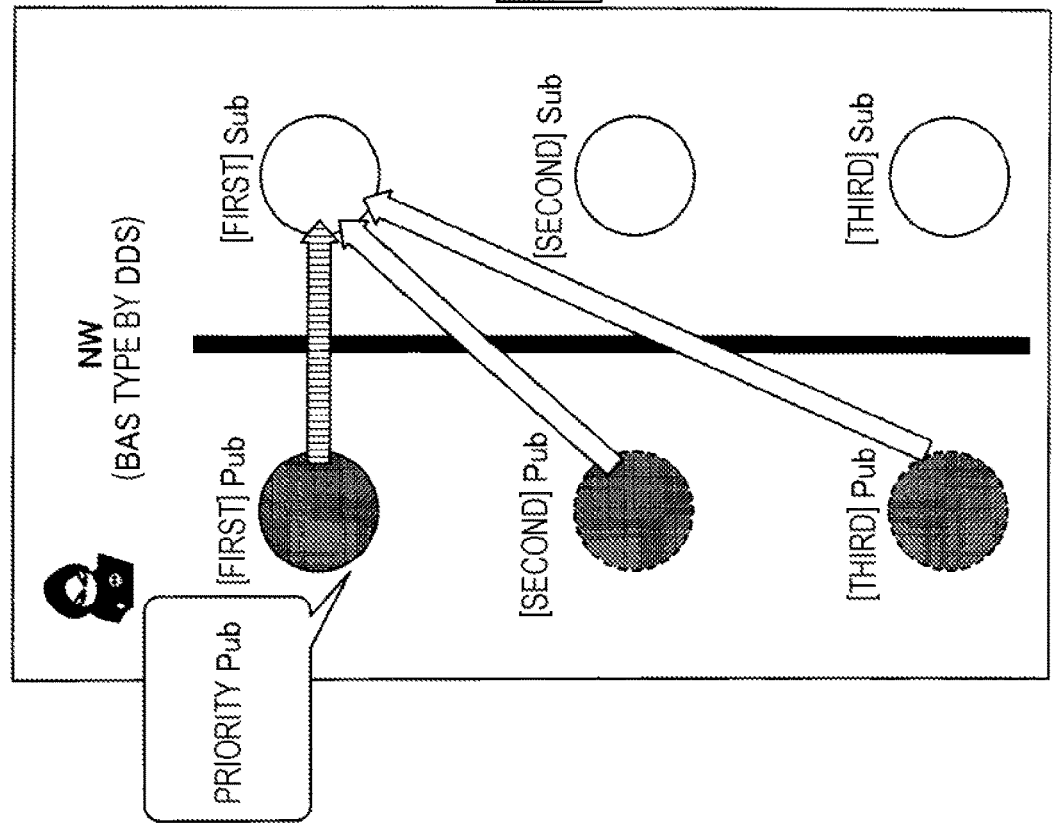
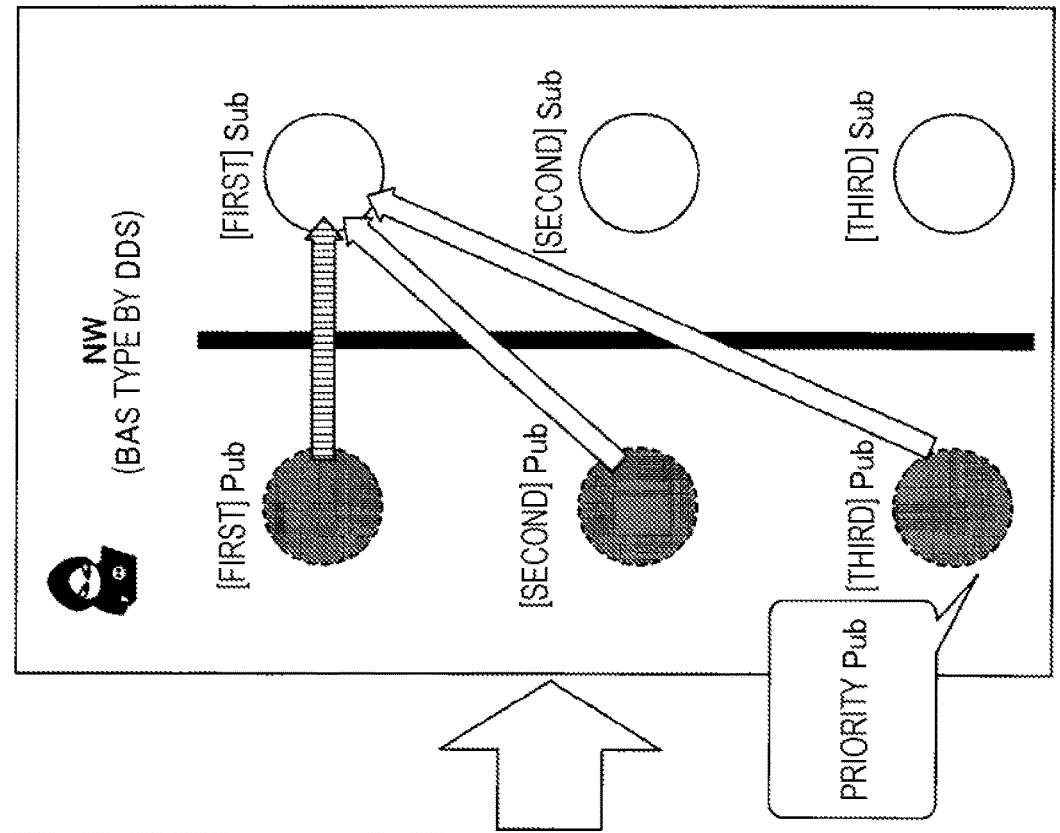

COMMUNICATION SYSTEM, INSPECTION APPARATUS, INSPECTION METHOD, AND PROGRAM

TECHNICAL FIELD

The present invention relates to a technology for checking a redundant configuration on a Pub side in a communication system that performs Pub/Sub communication.

BACKGROUND ART

In recent years, in order to implement a smart factory, devices on an information network (NW) and devices on a control NW are connected. In the future, a communication model that performs device interconnection and one-to-many, many-to-one communication in a lightweight and flexible manner is expected to be widespread.

A Publish/Subscribe communication (hereinafter, Pub/Sub communication) model has been proposed as a lightweight and flexible communication model as described above. In Pub/Sub communication, there are a Publisher, which is a client on a side on which a message called an event is created and transmitted (distributed), and a Subscriber, which is a client on a side on which the message is received (subscribed).

The Pub/sub communication has three properties of "spatial separation", "temporal separation", and "asynchronous processing". Due to the "spatial separation", the Publisher and the Subscriber do not need to know existence of each other. The "temporal separation" enables transmission and reception of data even in a case where the Publisher and the Subscriber do not exist on the network at the same time. Furthermore, by the "asynchronous processing", transmission and reception of an event can be performed asynchronously with other processing of the Publisher or the Subscriber.

The Pub/Sub communication model includes a broker type and a broker-less type. The configuration of the broker type is a configuration in which functions called a broker responsible for properties of the spatial separation, the temporal separation, and the asynchronous processing is arranged between the Pub and the Sub. The configuration of the broker-less type is a distributed configuration in which all nodes (Pub and Sub) include functions responsible for the properties of the spatial separation, the temporal separation, and the asynchronous processing. By providing a function called data distribution service (DDS) in each of the nodes, the above-described broker-less type configuration can be implemented. Note that the Pub/Sub communication model is also referred to as a publishing/subscribing model.

CITATION LIST

Non-Patent Literature

Non-Patent Literature 1: What's in the DDS Standard, Internet <URL: https://www.dds-foundation.org/omg-dds-standard/>

SUMMARY OF INVENTION

Technical Problem

In a communication system that performs Pub/Sub communication using the DDS, Pubs can be made redundant by a basic function of the DDS, and for example, which Pub among a plurality of the Pubs in the redundant configuration is handled as a preferential Pub (hereinafter, priority Pub) can be switched.

However, for example, there may be a case where the priority Pub is not actually switched as expected for some reason. Therefore, it is desirable to check in advance that the priority Pub is switched as expected.

The present invention has been made in view of the above points, and an object of the present invention is to provide a technology for checking a redundant configuration on a Pub side in a communication system that performs Pub/Sub communication.

Solution to Problem

According to the disclosed technology, a communication system is provided that performs communication among a plurality of nodes by a broker-less type publishing/subscribing model, the communication system including
  a checking management unit that receives a checking instruction for one application that is handled with priority on a subscriber side among one or more applications that are redundant on one or more of the nodes and functioning as a publisher side, and
  a checking instruction output unit that checks switching of an application handled with priority on the subscriber side to another application different from the one application among the one or more applications by inserting an anomaly in the one application.

Advantageous Effects of Invention

According to the disclosed technology, a technology is provided for checking a redundant configuration on a Pub side in a communication system that performs Pub/Sub communication.

BRIEF DESCRIPTION OF DRAWINGS

FIG. 4 is a diagram for describing an outline of an example.

DESCRIPTION OF EMBODIMENTS

Hereinafter, an embodiment of the present invention (present embodiment) will be described with reference to the drawings. The embodiment described below is only an example, and an embodiment to which the present invention is applied is not limited to the following embodiment.

In the embodiment described below, an example in which the present invention is applied to a communication system that performs Pub/Sub communication using DDS will be described, but the present invention is applicable not only to the Pub/Sub communication using the DDS.

(Pub/Sub Communication Using DDS)

First, DDS and Pub/Sub communication using the DDS as premises of the present embodiment will be described.

In the present embodiment, the above-described brokerless type configuration is employed, and the DDS includes a function corresponding to a broker, thereby implementing the broker-less type.

Here, delivery range management in the DDS will be described. In the DDS, a delivery NW is added to an NW I/F of a node. A delivery range set by a user is operated by this delivery NW and a filter inside the DDS, and enables transmission and reception of data appropriate for an application functioning as a Pub or a Sub.

Specifically, in the DDS, based on a data bus and the delivery range set by the user, a multicast address is assigned to the NW I/F that can be used in nodes, and the delivery NW is prepared. Whether to perform distribution by unicast using an existing IP address of a node or by a newly assigned multicast address can also be set when the delivery range is designated, and thus a physical data distribution range can be defined.

Figure 1:
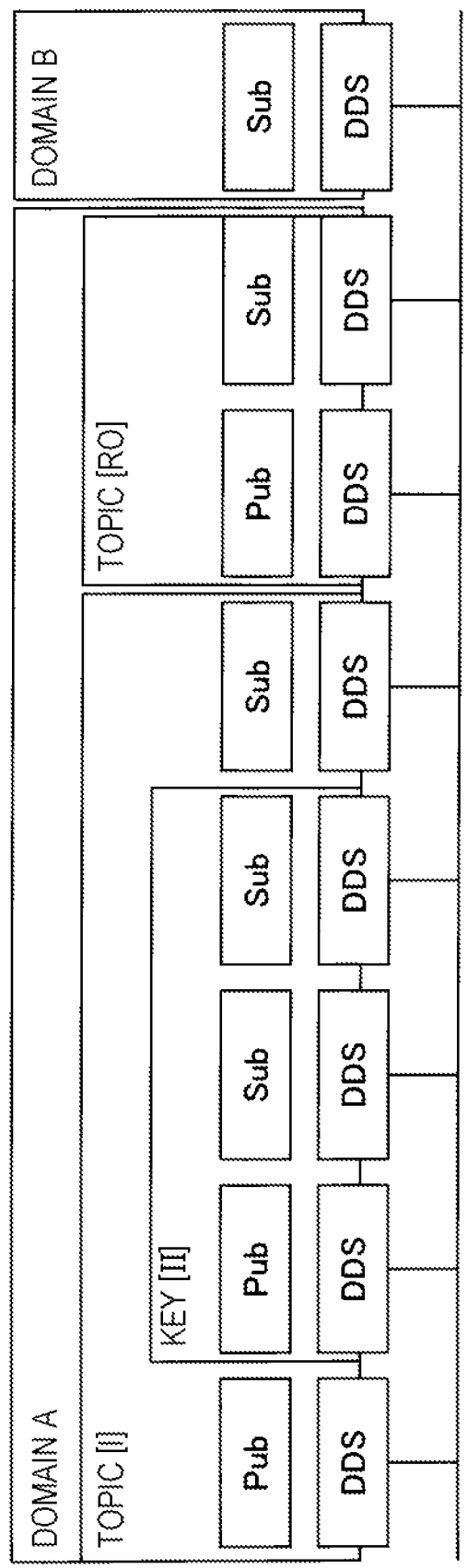
FIG. 1 is a diagram for describing Pub/Sub communication using DDS.

FIG. 1 illustrates an example of delivery ranges. In the example of FIG. 1, a domain A and a domain B are set as the delivery ranges. Furthermore, in the domain A, a delivery range for a topic [i] and a delivery range for a topic [ro] are set. Furthermore, a delivery range of a key [II] is set within the delivery range of the topic [i].

(System Configuration Example in Which DDS is Incorporated)

The DDS is a program that functions as middleware in a node (may be referred to as a computer, a communication device, or the like). A processing program as a base necessary for communication in the DDS is prepared as a library. A DDS program can be generated using this library from a data definition file for communication program generation including, as parameters, definitions (type, size, name, QoS, and the like) of data transmitted by an application (described as "APP"). Generation of the DDS itself is an existing technology.

Figure 2:
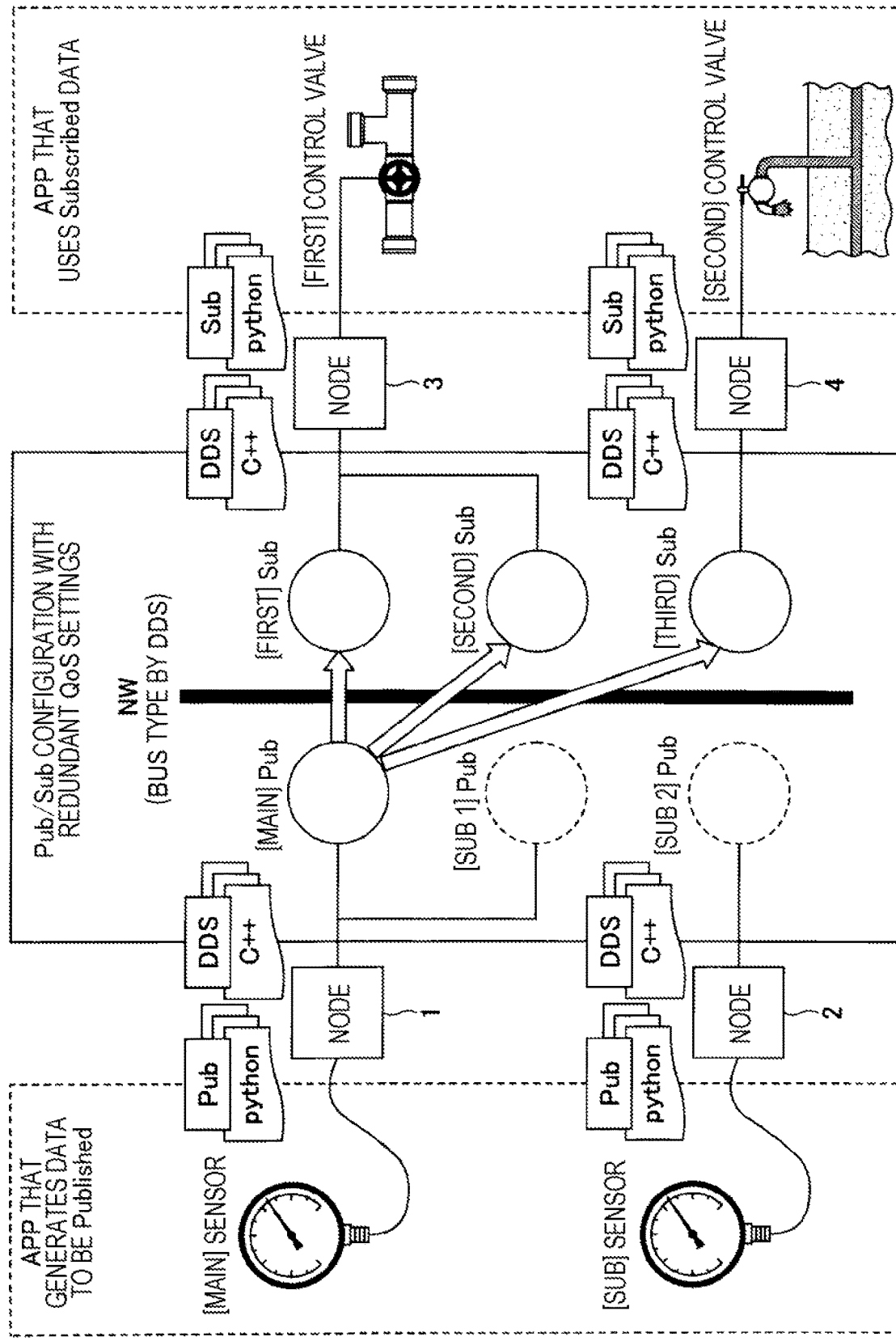
FIG. 2 is a diagram illustrating a system configuration example in which the DDS is incorporated.

FIG. 2 is a diagram illustrating a system configuration example in which the DDS is incorporated. FIG. 2 physically illustrates a configuration in which a plurality of nodes (computers) to which sensors and control valves are connected is connected to a logical bus network.

A sensor is connected to each of nodes 1 and 2, and an APP that generates data to be published and the DDS are mounted on each of the nodes 1 and 2. A control valve is connected to each of nodes 2 and 3, on which an APP that uses subscribed data and the DDS are mounted.

The example of FIG. 2 illustrates an example in which a Pub/Sub configuration with redundant QoS settings is implemented by the DDS. Specifically, the DDS of the node 1 configures a main Pub and a sub 1 Pub, and the DDS of the node 2 configures a sub 2 Pub. Furthermore, the DDS of the node 3 configures a first Sub and a second Sub, and the DDS of the node 4 configures a third Sub.

Note that, in the example of FIG. 2, an example in which APPs are described in python and the DDS is described in C++ is illustrated, but these are merely examples, and the APPs may be described in any program language. Furthermore, in a case where the Pub/Sub configuration is changed, there are changes that can be done partially and dynamically such as QoS, and changes that require restart of a process (including modification of a program).

Hereinafter, an example will be described as an example of the technology according to the present embodiment.

(System Configuration Example as Base in Present Example)

Next, an example of a communication system as a base in the present example will be described. In the communication system as the base in the present example, one node may belong to a plurality of domains. Furthermore, a plurality of Pubs/Subs may exist in one node. Note that, here, the Pub is an application that generates data to be published, and the Sub is an application that uses subscribed data. The functions related to the Pub/Sub communication are performed by the DDS.

Furthermore, both a Pub/Sub may exist in one node, and a Pub/Sub across a plurality of domains may exist in one node. Furthermore, a plurality of Pubs or a plurality of Subs may exist in one APP. Furthermore, the Pubs or the Subs in the same APP can be distinguished from one another. Furthermore, in the communication system in the present example, communication is plain text.

Figure 3:
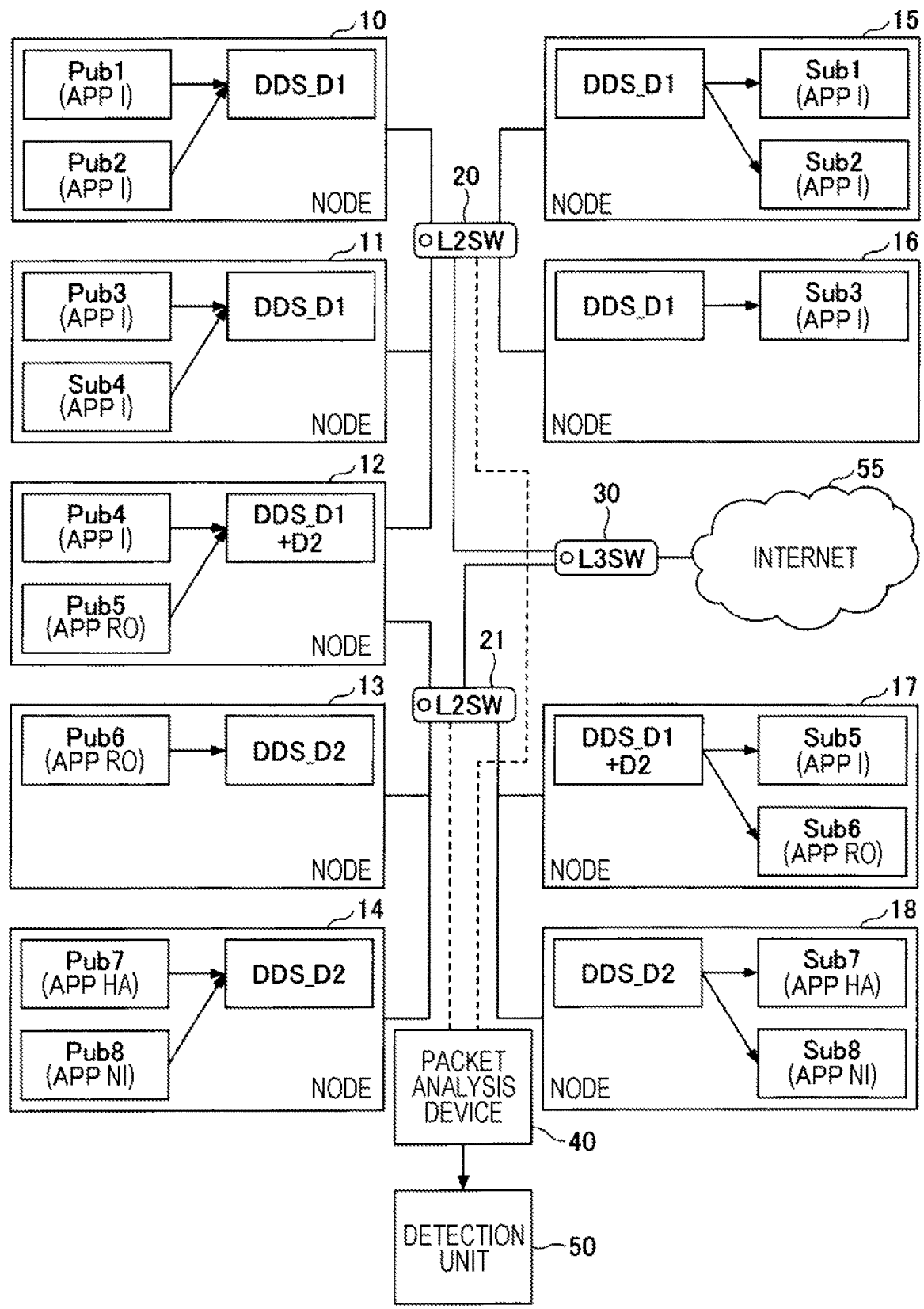
FIG. 3 is a diagram illustrating a configuration example of a system including a plurality of nodes.

FIG. 3 illustrates a configuration example of the communication system as the base in the present example. As illustrated in FIG. 3, the communication system includes nodes 10 to 18, L2SWs (layer 2 switches) 20 and 21, an L3SW (layer 3 switch) 30, a packet analysis device 40, and a detection unit 50.

In the example of FIG. 3, the nodes 10, 11, 12, 15, 16, and 17 belong to a domain D1, and the nodes 12, 13, 17, and 18 belong to a domain D2. For example, a domain to which a node belongs is indicated as D1 in "DDS D1" of the node 10. The node 12 and the node 17 belong to both the domain D1 and the domain D2.

For example, in the node 10, a "Pub1 (APP i)" is an application for publishing data of a topic [i], and functions as a Pub1 (Publisher1) in the Pub/Sub communication. In the node 10, there are two Pubs of the Pub1 (APP i) and a Pub2 (APP i). This indicates that there is one APP but the function of the DDS enables the one APP to function as the two Pubs. The same applies to a Sub as indicated in the node 15.

Furthermore, the node 11 includes both a Pub and a Sub of a Pub3 and a Sub4. There is a plurality of APPs that functions as a plurality of Pubs in the nodes 12 and 14, and there is a plurality of APPs that functions as a plurality of Subs in the nodes 17 and 18.

Furthermore, in the communication system illustrated in FIG. 3, the Pub1 (APP i) to a Pub4 (APP i) exist, and Pubs of the "APP i" are made redundant. Similarly, a Pub5 (APP ro) to a Pub6 (APP ro) exist, and Pubs of the "APP ro" are also made redundant.

Furthermore, the Internet 55 is connected to an end of the L3SW 30, and each node can communicate with the Internet 55. Furthermore, the packet analysis device 40 is connected to the L2SWs 20 and 21, and for example, the detection unit 50 can perform anomaly detection based on a packet analysis result.

(Outline of Present Example)

For example, a case will be considered in which, for a certain topic, there are three redundant Pubs of a first Pub, a second Pub, and a third Pub, and each of the Subs of the first Sub to the third Sub treats the first Pub as a priority Pub. In this case, data is distributed from each of the first Pub to the third Pub to each of the Subs, but only data distributed from the first Pub is transferred to APPs on a Sub side.

In the present example, in a case where an anomaly or the like occurs in the first Pub, each of the Subs can switch the priority Pub to the second Pub or the third Pub. Note that the anomaly includes, for example, a case where data of unauthorized contents (for example, data for the purpose of attacking a Sub, and the like) is transmitted as a result of takeover of a Pub by a third party, a case where a Pub is in an unauthorized state, and the like, in addition to a failure of a Pub.

FIG. 4 illustrates a state of the switching of the priority Pub. The example of FIG. 4 illustrates a state in which the priority Pub is switched to the third Pub in a case where an anomaly occurs in the first Pub that is the priority Pub. According to this switching, data distributed from the third Pub is passed to the APP in each of the Subs.

In the present example, a mechanism is provided that enables checking that the switching of the above priority Pub is correctly performed by inserting a pseudo anomaly or the like. As a result, for example, occurrence of a situation such as "although a redundant configuration is intended to be formed, the priority Pub has not been switched at the time of actual anomaly" can be prevented.

(System Configuration Example in Present Example)

Figure 5:
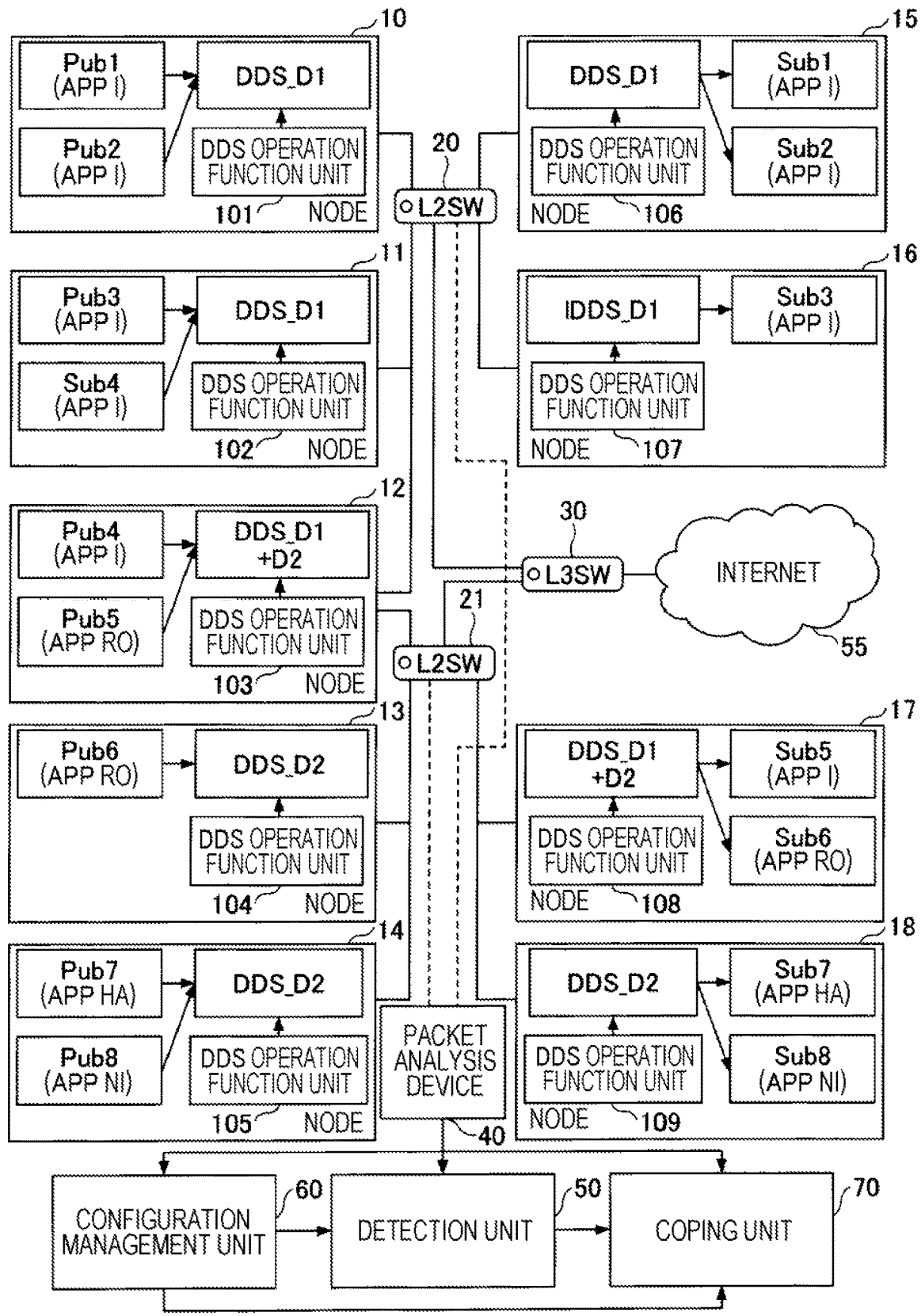
FIG. 5 is a diagram illustrating a system configuration example in the example.

FIG. 5 illustrates a configuration example of a communication system in the present example. As illustrated in FIG. 5, compared to the communication system as the base illustrated in FIG. 3, a DDS operation function unit is provided for each node, and a configuration management unit 60 and a coping unit 70 are included. Each of the DDS operation function units implements a function of switching the priority Pub in response to an instruction from the coping unit 70. FIG. 5 illustrates an example in which the nodes 10 to 18 include the respective DDS operation function units 101 to 109. Hereinafter, in a case where a node is not distinguished, the DDS operation function unit is referred to as a DDS operation function unit 100.

The configuration management unit 60 manages configuration information (NW configuration information) of the communication system, and the coping unit 70 performs a switching check of a priority Pub according to a checking instruction. In the example of FIG. 5, the detection unit 50 exists, but the detection unit 50 is unnecessary at the time of a switching check of a priority Pub. During actual operation, the priority Pub is switched in response to anomaly detection by the detection unit 50. Note that the detection unit 50, the configuration management unit 60, and the coping unit 70 may be included in the packet analysis device 40 or may be included in a device different from the packet analysis device 40. In the present example, it is assumed that the packet analysis device 40 includes the detection unit 50, the configuration management unit 60, and the coping unit 70.

(Configuration Management)

In order to perform a switching check of a priority Pub, configuration information of the communication system needs to be managed. This is because a checking point on the communication system (for example, a Pub that generates a pseudo anomaly, or the like) needs to be designated. Although the configuration information may be created and managed by any method, in the present example, the configuration information is created and managed by a plurality of pieces of relationship information that can be created from communication (traffic) flowing among the nodes being combined.

As the relationship information, three layers of an "IP relationship layer", a "participant relationship layer", and a "Pub/Sub relationship layer" representing topology of the horizontal axis of the NW are created. Since the IP relationship layer and the participant relationship layer are associated with each other and the participant relationship layer and the Pub/Sub relationship layer are associated with each other, all the three layers are eventually associated with each other, and by combining these three layers, a "combined layer" representing topology of the vertical axis of the NW is obtained. Configuration information is managed by holding the combined layer for a plurality of generations. Note that a generation refers to, for example, a division obtained by performing division by a certain time interval, an event interval, or the like. However, holding a plurality of generations is not essential, and for example, only the latest one generation may be held.

Figure 6:
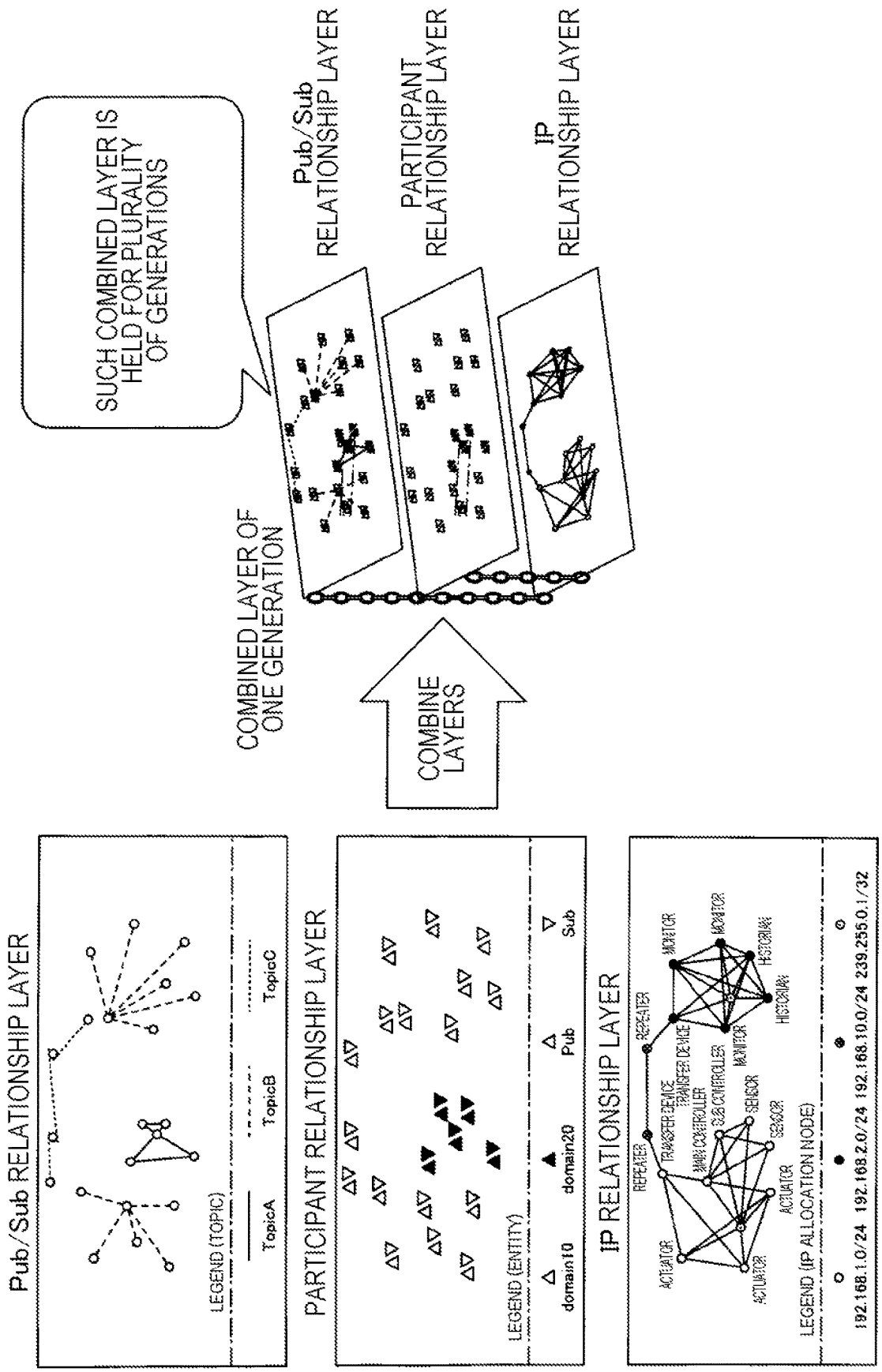
FIG. 6 is a diagram for describing configuration management.

FIG. 6 illustrates an example of the IP relationship layer, the participant relationship layer, the Pub/Sub relationship layer, and the combined layer. As illustrated in FIG. 6, the IP relationship layer is represented by a graph structure in which IP addresses are vertices and transmission and reception relationships of data at an IP level are edges. In the IP relationship layer, in a case where there is an edge between vertices, it indicates that there is a data transmission and reception relationship between nodes including IP addresses represented by the vertices. Note that one node may have a plurality of IP addresses (for example, an IP address for multicast may be included in addition to an IP address for unicast). The participant relationship layer represents a globally unique identifier (GUID) of a node using one symbol (triangular or inverted triangular symbol), and each symbol represents whether the domain to which each GUID belongs is a Pub or a Sub. The Pub/Sub relationship layer includes GUIDs of the nodes as vertices and relationships of whether the nodes belong to the same topics as edges, and represents relationships of topics to which the GUIDs belong. Note that the participant relationship layer is also represented by a graph structure including the above symbols (triangular or inverted triangular symbols) as vertices. In the example of FIG. 6, there is no edge in the graph structure representing the participant relationship layer, but for example, vertices belonging to the same domains may be connected by edges.

The Pub/Sub relationship layer can be created using information acquired from communication as data distribution, and the participant relationship layer can be created using information acquired from communication for DDS operation. Meanwhile, the IP relationship layer can be created using information acquired from both communication as data distribution and communication for DDS operation. Note that the communication for DDS operation is communication performed in a case where a node participates in the Pub/Sub communication; communication performed in a case where another node is searched for; communication performed in a case where distribution contents are agreed; and the like.

In the IP relationship layer, one vertex is associated with a 5-tuple including an IP address of a node (src/dst IP addresses, src/dst port numbers, protocol number). In the participant relationship layer, a GUID and a port number are associated with one symbol (triangular or inverted triangular symbol). In the Pub/Sub relationship layer, a GUID and a topic name are associated with one vertex. The GUID is an identifier used in the DDS, and is generated from an IP address, a port number, and the like. Note that one node may include a plurality of GUIDs (for example, in a case where one node functions as both a Pub and a Sub; in a case where one node belongs to a plurality of domains or a plurality of topics; and the like).

Therefore, the IP relationship layer can be associated with the participant relationship layer using port numbers, and the participant relationship layer can be associated with the Pub/Sub relationship layer using GUIDs. By combining the three layers being combined by these associations, the combined layer is obtained as the NW configuration information of the communication system that performs Pub/Sub communication. This combined layer is held, for example, for a plurality of generations.

Here, in a case of focusing on one node in the combined layer, one or more vertices of the IP relationship layer (5-tuple including IP addresses) correspond to this node, and one or more vertices of the participant relationship layer (port numbers and GUIDs) are associated with the one or more vertices. Furthermore, zero or more vertices of the Pub/Sub relationship layer (GUIDs and topic names) are associated with the one or more vertices of the participant relationship layer. That is, in the combined layer, for each node, a tree structure having the node as a vertex (a tree structure in which the highest hierarchy level represents the IP address, the next hierarchy level represents the port number, the next hierarchy level represent the GUID, and the lowest hierarchy level represents the topic name) is obtained, and the tree structure represents vertical axis topology.

(Configuration Example of Each Unit in Present Example)

In the present example, a mechanism is provided that enables checking that switching of a priority Pub is correctly performed by inserting a pseudo anomaly in a checking point using the above configuration information or the like.

Figure 7:
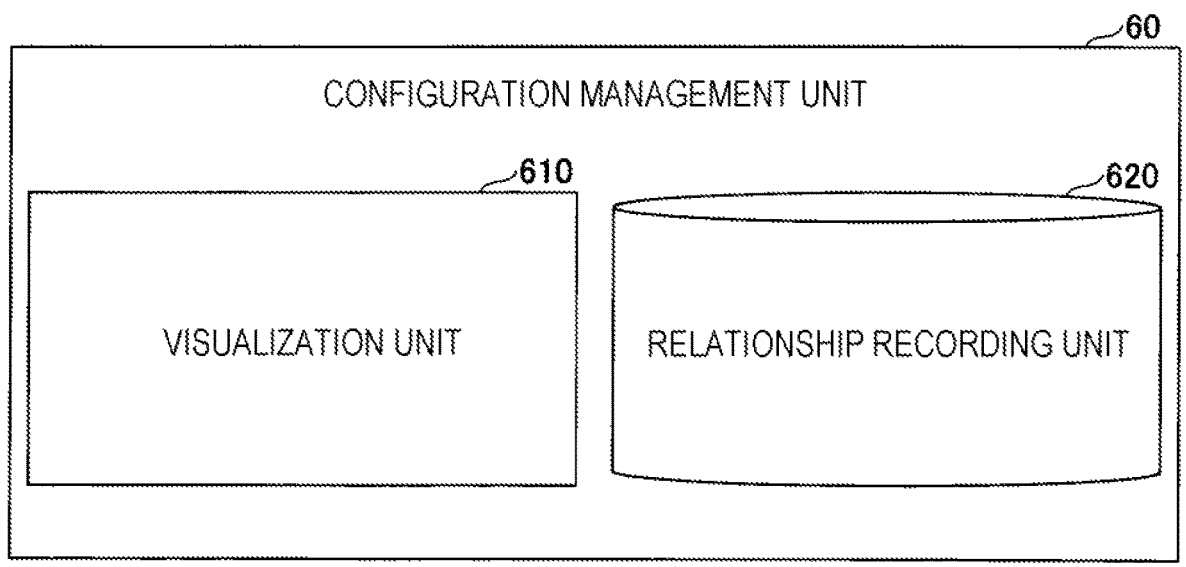
FIG. 7 is a diagram illustrating a configuration example of a configuration management unit in the example.

FIG. 7 illustrates a configuration example of the configuration management unit 60. As illustrated in FIG. 7, the configuration management unit 60 includes a visualization unit 610 and a relationship recording unit 620. Configuration information (IP relationship layer, participant relationship layer, Pub/Sub relationship layer, and combined layer) of at least one generation is recorded in the relationship recording unit 620. Note that it is assumed that the configuration information is created in advance and recorded in the relationship recording unit 620. Operations of each unit and the like will be described in a sequence to be described below.

Figure 8:
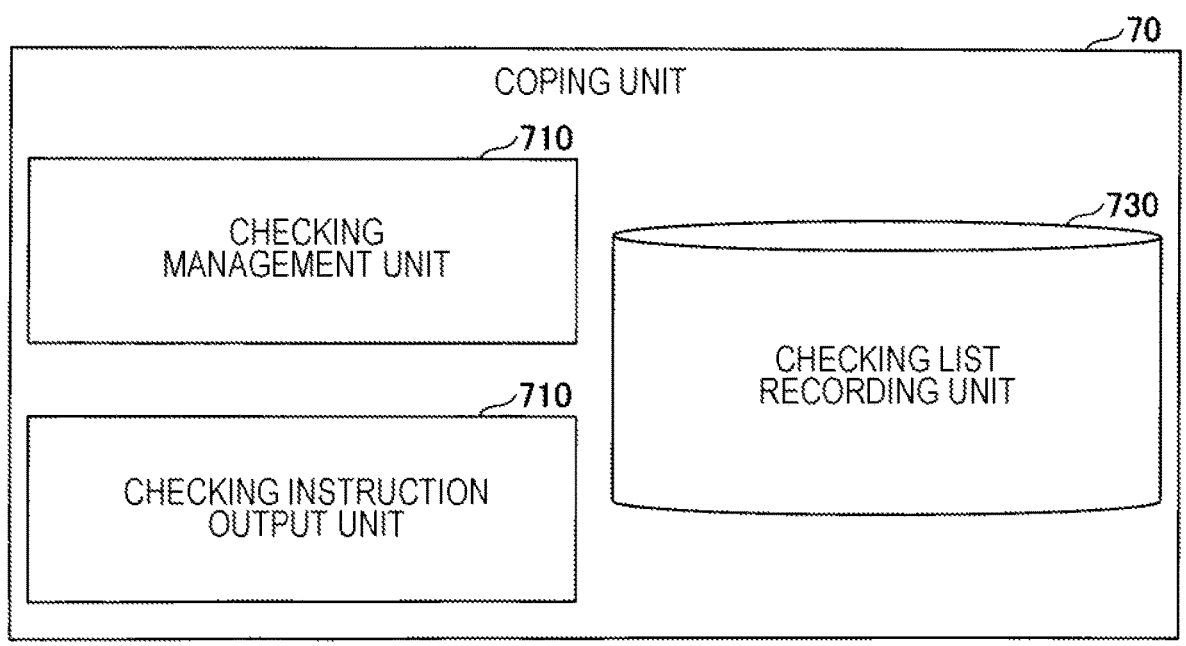
FIG. 8 is a diagram illustrating a configuration example of a coping unit in the example.

FIG. 8 illustrates a configuration example of the coping unit 70. As illustrated in FIG. 8, the coping unit 70 includes a checking management unit 710, a checking instruction output unit 720, and a checking list recording unit 730. Operations of each unit and the like will be described in a sequence to be described below.

Figure 9:
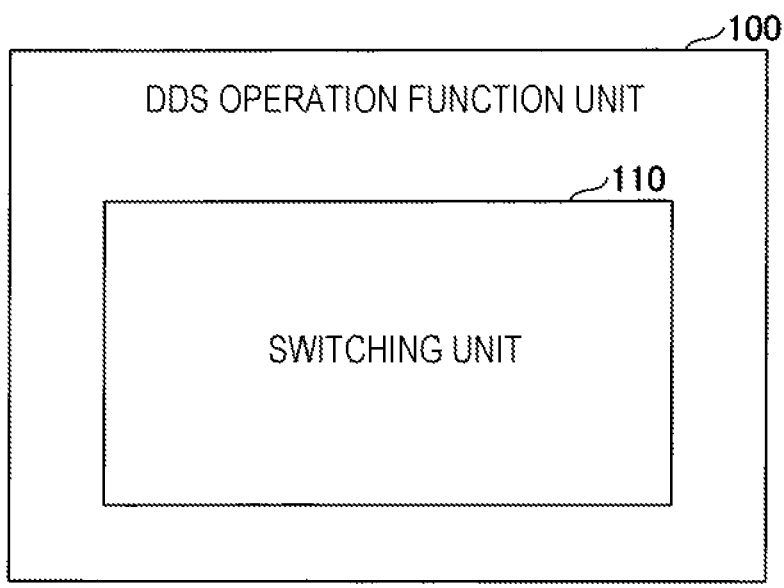
FIG. 9 is a diagram illustrating a configuration example of a DDS operation function unit in the example.

FIG. 9 illustrates a configuration example of the DDS operation function unit 100. As illustrated in FIG. 9, the DDS operation function unit 100 includes a switching unit 110. Operations of the switching unit 110 will be described in the sequence to be described below.

In the present example, checking that switching of a priority Pub is correctly performed is performed by inserting a pseudo anomaly into a checking point or the like by the above each unit.

(Sequence Example of Present Example)

Figure 10:
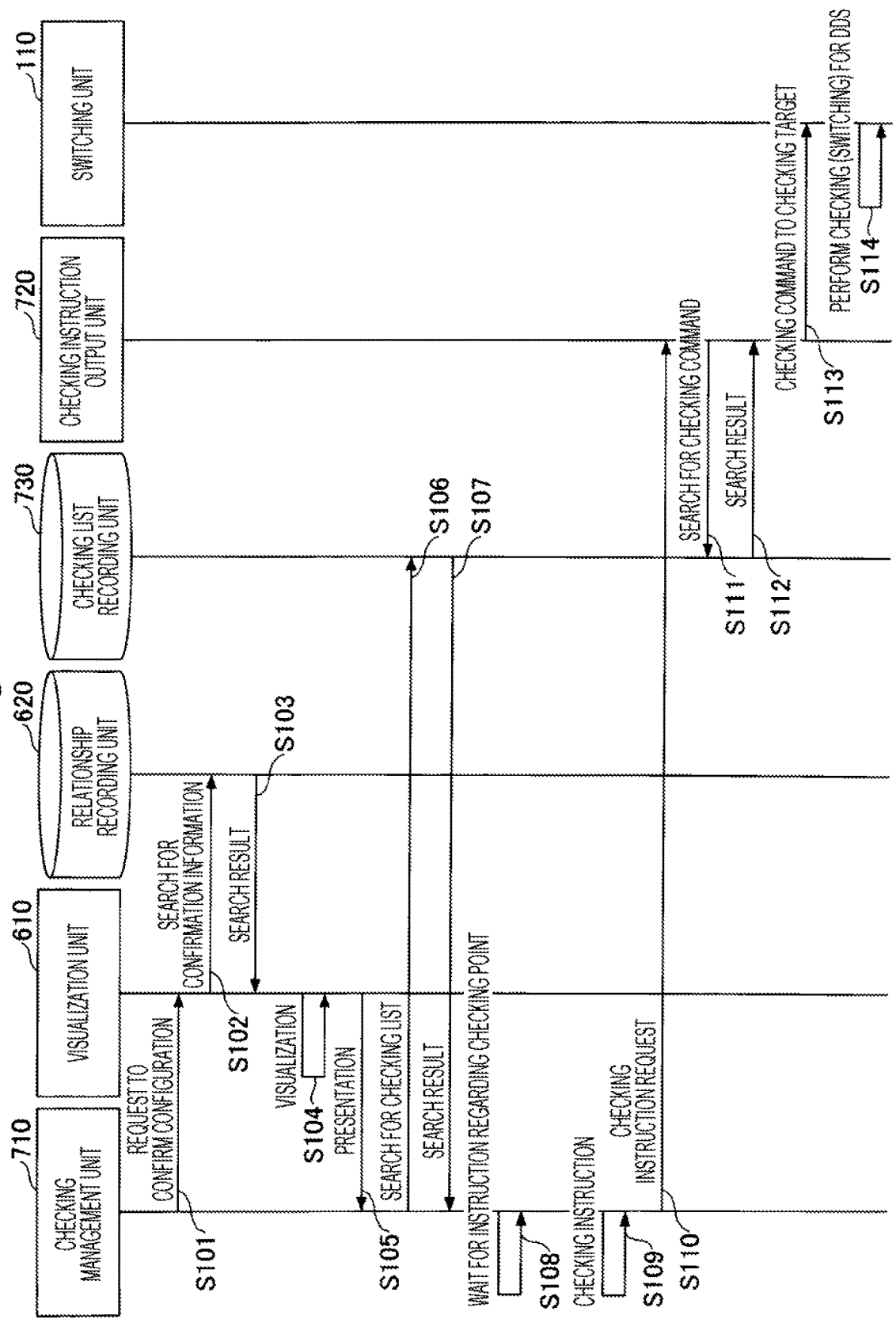
FIG. 10 is a diagram illustrating a processing flow in the example.

Next, an operation example of the communication system in the present example will be described with reference to a sequence diagram of FIG. 10.

The checking management unit 710 requests the visualization unit 610 to confirm the communication system configuration (S101). In response to the configuration confirmation, the visualization unit 610 searches in the relationship recording unit 620 for current configuration information (that is, configuration information of the latest generation) and acquires the configuration information as a search result (S102 to S103). Then, the visualization unit 610 creates visualization information of the acquired configuration information and presents the visualization information to the checking management unit 710 (S104 to S105). The visualization information is information for visualizing and displaying the communication system configuration represented by the configuration information on, for example, a display. As a result, a user can confirm the communication system configuration (that is, data transmission and reception relationship of Pubs/Subs, belonging domains, topics, redundant configuration of Pubs, and the like).

The checking management unit 710 searches in the checking list recording unit 730 for a checking list and acquires the checking list as a search result (S106 to S107). The checking list is a list of checking points that can be checked. Although such a checking list can be created by a method such as creating the checking list based on a design document of a system or creating the checking list based on information extracted based on communication information before checking is performed, in the present example, a creation method is not limited thereto, and the checking list only needs to be created in advance. Note that a checking point is represented by, for example, a set of an ID and a name of a priority Pub to be checked, a belonging domain, a topic, QoS information, an IP address of a node including the Pub, and the like.

Thereafter, the checking management unit 710 transitions into a waiting state for an instruction regarding a checking point to be checked (S108). For example, a user or the like can decide which Pub is to be checked from the visualized configuration information and the checking list.

When the checking point is designated and a checking instruction is given by the user or the like and these are received, the checking management unit 710 transmits the checking instruction request of the checking point to the checking instruction output unit 720 (S109 to S110). The checking point designated here is a priority Pub in which an anomaly is assumed to have occurred. Note that, in the checking instruction, a checking type (for example, "stop" indicating that the Pub has been stopped, "modification" indicating that the Pub setting has been changed, and the like) may be designated, and in a case where the checking type is "modification", the changed contents may be designated. For example, in a case where it is desired to perform a check in a case where the Pub has been stopped due to a failure or the like, the checking type "stop" is designated. In a case where it is desired to perform a check in a case where the Pub has been taken over by a third party and is transmitting unauthorized data or in an unauthorized state, the checking type "modification" is designated, and contents in which unauthorized data is transmitted or contents in which an unauthorized state is represented are designated as the changed contents.

As a specific example of the unauthorized state, for example, it is assumed that a Pub of a certain node belongs to the topic "i" of the domain A and is transmitting temperature data in the normal state. At this time, in a case where the contents are modified to contents in which the Pub of the node belongs to the domain B, it can be said that the Pub is in an unauthorized state.

However, the above-described checking type is an example, and various types of checks may be possible. For example, there may be a checking type in which a check in a case where a new Pub participates in Pub/Sub communication is performed.

Upon receiving the checking instruction request, the checking instruction output unit 720 searches in the checking list recording unit 730 for a command for switching the priority Pub from the Pub of the checking point to another Pub (hereinafter, switching destination Pub) (hereinafter, the command is referred to as a checking command), and acquires the checking command as a search result (S111 to S112). Note that the switching destination Pub is decided from Pubs of the checking points and Pubs having a redundant configuration, but at this time, one Pub may be decided in advance, or may be decided according to some rule. Furthermore, although the checking command is recorded in advance in the checking list recording unit 730, for example, the checking command may be searched for and acquired according to the checking type, or the checking command may be searched for and acquired according to the Pub to be checked, the belonging domain, the topic, and the like in addition to the checking type.

Then, the checking instruction output unit 720 transmits the checking command to switching units 110 (S113). Note that the checking instruction output unit 720 transmits the checking command to both the switching units 110 of the switching destination Pub and a Sub that receives data from the switching destination Pub. However, the contents of the checking command may be different between the switching destination Pub and the Sub that receives data from the switching destination Pub.

Upon receiving the checking command, the switching units 110 perform the checking command for DDS (S114). Note that, at this time, restart of the process and the like are also performed as necessary. Accordingly, whether the priority Pub is switched from the Pub to be checked (current priority Pub) to the switching destination Pub is checked.

(Hardware Configuration Example)

A node including a DDS operation function unit 100 and the packet analysis device 40 including the detection unit 50, the configuration management unit 60, and the coping unit 70 in the present embodiment can be implemented, for example, by causing a computer to perform a program in which the processing contents described in the present embodiment are described.

The above program may be recorded in a computer-readable recording medium (such as a portable memory) to be stored and distributed. Also, the program may be provided through a network such as the Internet or an electronic mail.

Figure 11:
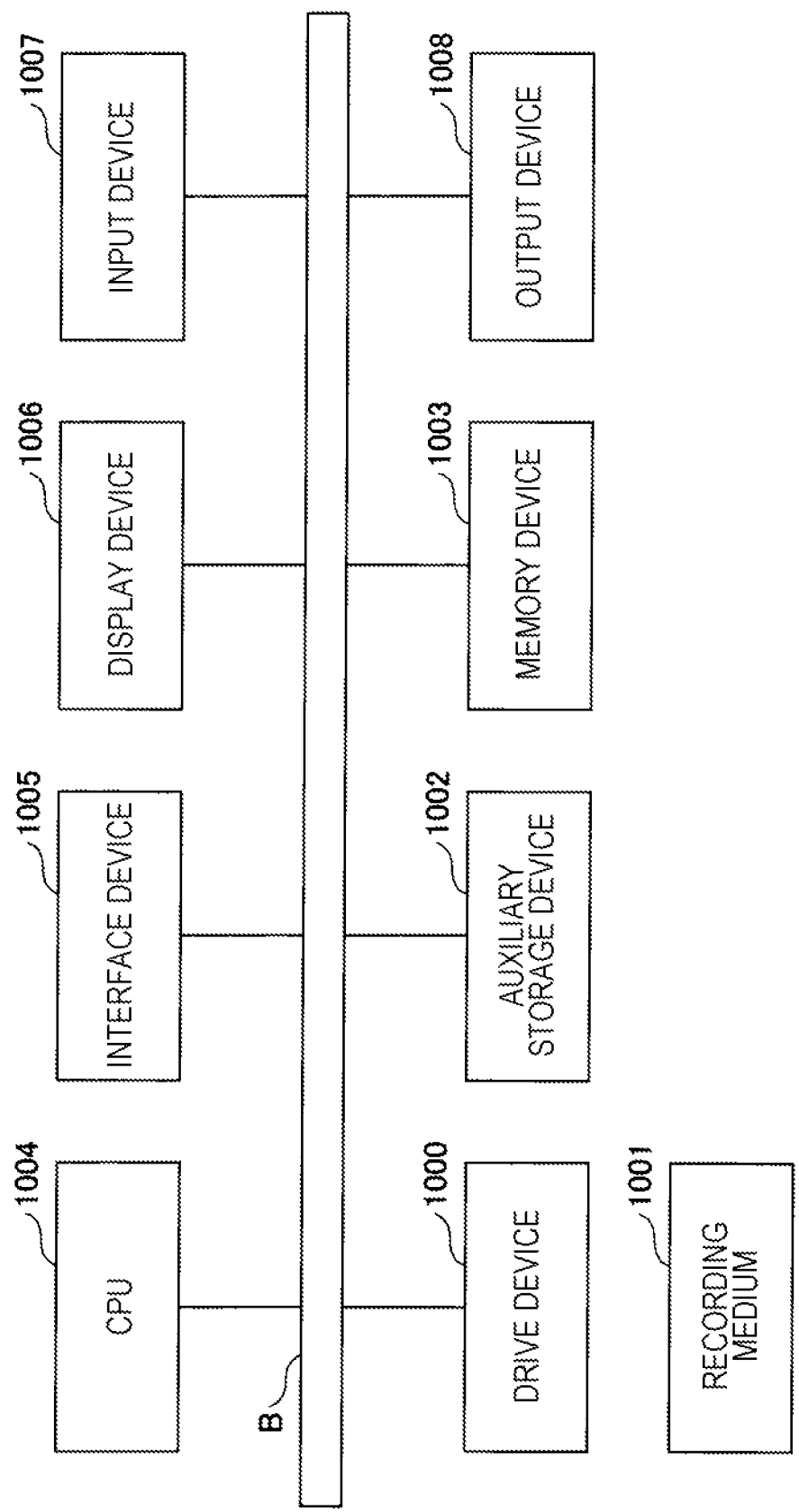
FIG. 11 is a diagram illustrating a hardware configuration example of devices.

FIG. 11 is a diagram illustrating a hardware configuration example of the above computer. The computer of FIG. 11 includes a drive device 1000, an auxiliary storage device 1002, a memory device 1003, a CPU 1004, an interface device 1005, a display device 1006, an input device 1007, an output device 1008, and the like, which are connected to each other by a bus B.

The program for performing processes in the computer is provided through a recording medium 1001 such as a CD-ROM or a memory card, for example. When the recording medium 1001 that stores the program is set in the drive device 1000, the program is installed from the recording medium 1001 into the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is issued, the memory device 1003 reads the program from the auxiliary storage device 1002, and stores the program therein. The CPU 1004 implements functions related to the units described above according to the program stored in the memory device 1003. The interface device 1005 is used as an interface for connection to the network. The display device 1006 displays a graphical user interface (GUI) or the like according to the program. The input device 1007 includes a keyboard and a mouse, buttons, a touch panel, or the like, and is used to input various operation instructions. The output device 1008 outputs a calculation result. Note that the node or the packet analysis device 40 may not include either or both of the display device 1006 and the input device 1007.

Effect of Embodiment

According to the technology of the present embodiment, a redundant configuration on a Pub side in a communication system that performs Pub/Sub communication can be checked.

Summary of Embodiment

The present description discloses at least a communication system, an inspection apparatus, an inspection method, and a program described in the following clauses.

(Clause 1)

A communication system that performs communication among a plurality of nodes by a broker-less type publishing/subscribing model, the communication system including:
 a checking management unit that receives a checking instruction for one application that is handled with priority on a subscriber side among one or more applications that are redundant on one or more of the nodes and functioning as a publisher side; and
 a checking instruction output unit that checks switching of an application handled with priority on the subscriber side to another application different from the one application among the one or more applications by inserting an anomaly in the one application.

(Clause 2)

The communication system according to the clause 1,
 in which the checking management unit presents configuration information indicating a network configuration of the communication system and a checking list created in advance to a user, and receives a checking instruction for the one application from the user.

(Clause 3)

The communication system according to the clause 2,
 in which the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

(Clause 4)

An inspection apparatus connected to a plurality of nodes that perform communication by a broker-less type publishing/subscribing model, the inspection apparatus including:

a checking management unit that receives a checking instruction for one application that is handled with priority on a subscriber side among one or more applications that are redundant on one or more of the nodes and functioning as a publisher side; and a checking instruction output unit that checks switching of an application handled with priority on the subscriber side to another application different from the one application among the one or more applications by inserting an anomaly in the one application.

(Clause 5)

The inspection apparatus according to the clause 4, in which the checking management unit presents configuration information indicating a network configuration of a communication system including the plurality of nodes and a checking list created in advance to a user, and receives a checking instruction for the one application from the user.

(Clause 6)

The inspection apparatus according to the clause 5, in which the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

(Clause 7)

An inspection method performed by an inspection apparatus connected to a plurality of nodes that perform communication by a broker-less type publishing/subscribing model, the inspection method including:

a checking management step for receiving a checking instruction for one application that is handled with priority on a subscriber side among one or more applications that are redundant on one or more of the nodes and functioning as a publisher side; and a checking instruction output step for checking switching of an application handled with priority on the subscriber side to another application different from the one application among the one or more applications by inserting an anomaly in the one application.

(Clause 8)

A program causing a computer to function as the inspection apparatus according to any one of clauses 4 to 6.

Although the present embodiment has been described above, the present invention is not limited to such a specific embodiment, and various modifications and changes can be made within the scope of the present invention disclosed in the claims.

REFERENCE SIGNS LIST 10 to 18 Node
20, 21 L2SW
L3SW
Packet analysis device
50 Detection unit
55 Internet
60 Configuration management unit
70 Coping unit
100 DDS operation function unit
110 Switching unit
610 Visualization unit
620 Relationship recording unit
710 Checking management unit
720 Checking instruction output unit
730 Checking list recording unit
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system that performs communication among a plurality of nodes by a broker-less type publishing/subscribing model, the communication system comprising:
a computer including a memory and a processor configured to
receive a checking instruction for one application that is handled with priority on a subscriber side among one or more applications that are redundant on one or more of the nodes and functioning as a publisher side; and
check switching of an application handled with priority on the subscriber side to another application different from the one application among the one or more applications by inserting an anomaly in the one application.

2. The communication system according to claim 1, wherein the processor presents configuration information indicating a network configuration of the communication system and a checking list created in advance to a user, and receives the checking instruction for the one application from the user.

3. The communication system according to claim 2, wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

4. An inspection apparatus connected to a plurality of nodes that perform communication by a broker-less type publishing/subscribing model, the inspection apparatus comprising:
a memory; and
a processor configured to
receive a checking instruction for one application that is handled with priority on a subscriber side among one or more applications that are redundant on one or more of the nodes and functioning as a publisher side; and
check switching of an application handled with priority on the subscriber side to another application different from the one application among the one or more applications by inserting an anomaly in the one application.

5. The inspection apparatus according to claim 4, wherein the processor presents configuration information indicating a network configuration of a communication system including the plurality of nodes and a checking list created in advance to a user, and receives the checking instruction for the one application from the user.

6. The inspection apparatus according to claim 5, wherein the configuration information is information in which, using first relationship information indicating a relationship among the nodes regarding transmission and reception of the communication, second relationship information indicating a relationship among the nodes regarding a belonging domain and whether the nodes are on a publisher side or on a subscriber side, and third relationship information indicating a relationship among the nodes regarding a topic to be published and subscribed, the first relationship information and the second relationship information are associated with each other by IP addresses and port numbers, and the second relationship information and the third relationship information are associated with each other by identifiers used in the publishing/subscribing model.

7. An inspection method performed by an inspection apparatus that includes a memory and a processor, and is connected to a plurality of nodes that perform communication by a broker-less type publishing/subscribing model, the inspection method comprising:

receiving a checking instruction for one application that is handled with priority on a subscriber side among one or more applications that are redundant on one or more of the nodes and functioning as a publisher side; and checking switching of an application handled with priority on the subscriber side to another application different from the one application among the one or more applications by inserting an anomaly in the one application.

8. A non-transitory computer-readable recording medium having computer-readable instructions stored thereon, which, when executed, cause a computer including a memory and processor to function as the inspection apparatus according to claim 4.

\* \* \* \* \*